Patented Oct. 9, 1945

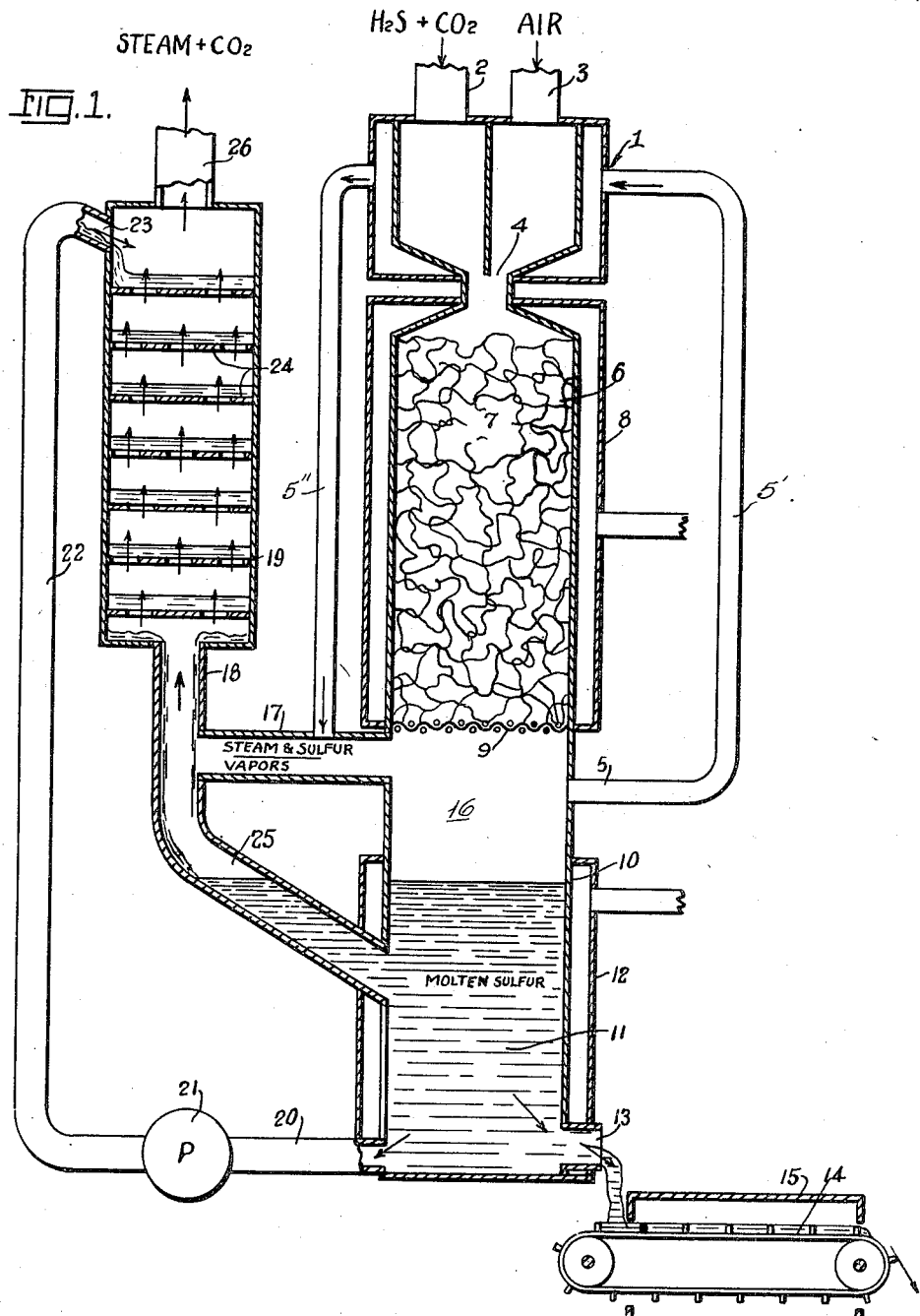

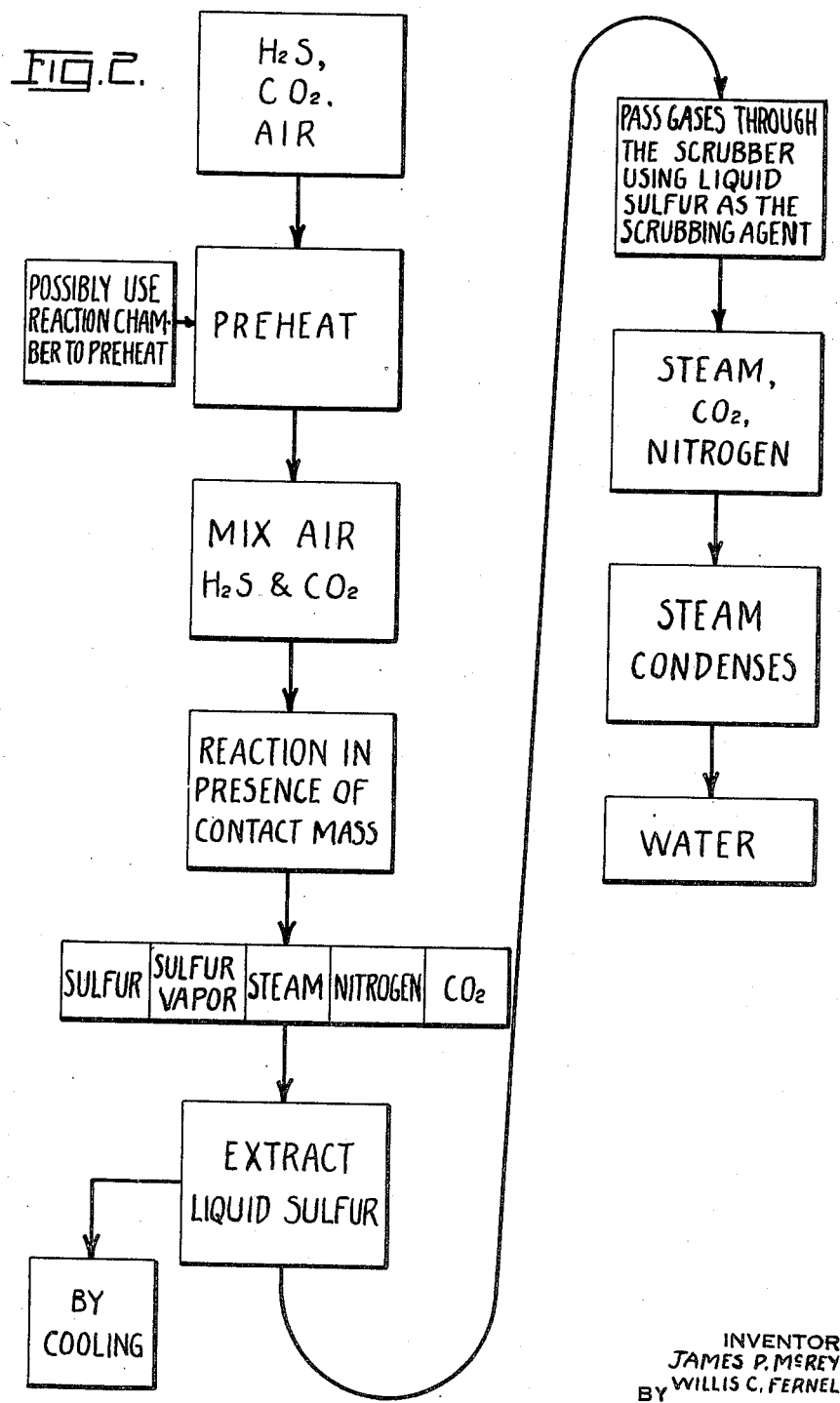

2,386,390

UNITED STATES PATENT OFFICE 2,386,390

APPARATUS FOR EXTRACTING SULPHUR FROM GASES

Willis C. Fernelius, West Lafayette, Ind., and James P. McReynolds, Columbus, Ohio Original application December 1, 1941, Serial No. 421,162. Divided and this application August 26, 1942, Serial No. 456,448

11 Claims. (Cl. 23—262)

This invention relates to method and apparatus for the extraction or recovery of sulphur in elemental form by the oxidation of hydrogen sulphide present in gases of various sorts, and is a division of copending application Serial No. 421,162, filed December 1, 1941.

It is the object of our invention to provide a method and apparatus for the recovery of sulphur by the oxidation of hydrogen sulphide.

It is our particular object to provide a method and apparatus for the complete desulphurization of the gases of the sulphur and deflowering of the main body of the gases and the overrun gases which may have some residual flowers of sulphur.

It is an object to eliminate the steam from the sulphur and the dewatering of the sulphur thereby in order to get a homogeneous result.

It is a further object of our invention to remove the flowers of sulphur from the overrun gases and return such flowers of sulphur to the molten sulphur resulting from the first stage of the method.

In particular, it is the object of our invention to provide for the introduction of air with hydrogen sulphide, either with or without admixture gases, such as nitrogen and carbon dioxide, preferably preheating these gases, and then passing them at a temperature from approximately 500° to 1000° centigrade, over a relatively long and narrow body of porous material forming a contact mass of high surface to volume ratio, and of sufficient length of the packed column so that all mixtures of gas will come in contact with the packing at high rates of gas flow so that the resulting reaction produces molten sulphur, the reaction taking place at a temperature above the boiling point of sulphur, and preferably conducted at a materially increased temperature above that point, that is, in the neighborhood of from 700° to 800° centigrade.

It is an object in this phase of the method to maintain such an operating temperature that all of the sulphur formed will leave the reaction chamber in vapor state.

It is a further object that the length of the reaction chamber and the diameter thereof be in such relationship that a large volume of packing may be enclosed within a relatively small overall bulk for the reactor.

It is our object to provide a recovery device which will produce a product mainly as liquid sulphur free from water by using a tower packed with ceramic bodies maintained at a temperature above the boiling point of sulphur; and also a condenser for sulphur vapor and a collector for sulphur in liquid form.

It is a further object to provide for using a portion of the liquid sulphur so that it can be brought in contact, in the second phase of the method, with the gases from the reaction chamber in such a way that the liquid sulphur acts as a scrubbing liquid for the removal of sulphur vapor from the gas mixture.

It is an object of the invention to provide a receiver for the liquid sulphur which drops from the condensing tower, which is maintained at a temperature above the melting point of sulphur, so that the liquid sulphur produced may be withdrawn as formed, and used for scrubbing the flowers of sulphur from the overrun gases from the first phase of the operation in the reaction chamber.

It is a further object to provide for a continuous or intermittent removal of liquid sulphur with means of maintaining a predetermined temperature gradient during transition from liquid to solid sulphur, and to secure the resultant solid sulphur free from amorphous sulphur so that the product will have definite and reproducible properties in such further processing as grinding. Heretofore, it has been difficult to provide any means or method of controlling the resultant sulphur product and its physical characteristics, so as to produce a uniform product.

Referring to the drawings:

Figure 1 is a diagrammatic view of a typical apparatus employed for the purpose of this invention.

Figure 2 is a flow sheet showing the several steps of the method.

It will be understood that these drawings are purely diagrammatic, and neither the details of construction nor the dimensions are important, except the general proportioning of the reaction chamber as herein set forth.

The apparatus of this invention and the method are used for carrying out the oxidation of hydrogen sulphide to sulphur and water, with oxygen, according to the equation:

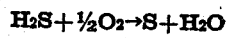

$$H_2S + \tfrac{1}{2}O_2 \rightarrow S + H_2O$$

The oxygen is generally supplied by air introduced into the reaction chamber. The hydrogen sulphide may be pure or diluted with such ingredients as $N_2$, $CO_2$, etc.

Referring to the drawings in detail:

The chamber 1 is used to preheat hydrogen sulphide entering through the pipe 2, and air entering through the pipe 3 into the mixing chamber 4. We prefer to use approximately two volumes of hydrogen sulphide to one volume of oxygen as our general rule of action.

Exit gases making their exit at 5, after having passed through the reaction chamber 6, and continue upwardly through pipe 5' into chamber 1 and thereafter return through pipe 5" to pipe 17, for preheating purposes. The preheated hydrogen sulphide and air, with any entrained gases, such as carbon dioxide and nitrogen, are introduced into the reaction chamber 6. This chamber is designed to provide a thorough mixing and heating of all portions of the gas. It is of sufficient length to maintain a continuous flow of gas at a given temperature for a given length of time. It contains a contact mass 7 (not necessarily a catalyst) to permit of a continuous flow of gases at a given temperature for a given length of time. The length and diameter of this column must be in such relationship that a large volume of packing may be enclosed within a relatively small overall bulk for the reactor. The contact mass 7 must have a high surface to volume ratio, and the length of this packed column must be sufficient that all mixtures of gases will come in contact with the packing at high rates of gas flow. This tower is packed with ceramic bodies 7, preferably consisting of porous, unglazed, broken pottery or such material as carborundum, or its equivalent, constituting a high contact area.

The chamber 6 is surrounded with a heat interchange jacket 8, i. e. a temperature control.

One of the vital features of our invention is the temperature being maintained in the reactor chamber. We maintain temperatures above the boiling point of sulphur so that we have a continuous process. The reaction proceeds at temperatures preferably from 700° to 800° centigrade. The melting point of sulphur is 112° centigrade and the boiling point is 445° centigrade. It is desired to maintain the temperature above the boiling point between the temperatures of 445° to 1000° centigrade. We have found the optimum conditions to be at a temperature of from 700° to 800° centigrade.

The contact mass rests upon some suitable foraminous support 9, so that the molten sulphur is condensed as a liquid, essentially free of water, water vapor and free of gas. It descends into the collector 10, where it is collected as at 11. This chamber 10 is surrounded by another chamber 12 which is used with a suitable medium in it to control the temperature of the sulphur collected at 11. The sulphur so collected may be drawn off into a storage tank or directly collected on a continuous conveyor as at the exit 13 and on to the conveyor 14. The temperature at which the sulphur is tapped at 13, and the subsequent rate of cooling on the conveyor 14, will be governed by the kind of sulphur which is desired.

The temperature of tapping, of course, may be limited somewhat by the range of high viscosity of the liquid sulphur. It is preferred to maintain the sulphur at 11, at not less than the melting point of sulphur at 112° centigrade. In order to control the temperature of the sulphur making its exit on the conveyor, a heating oven 15 may be employed, and thereby a predetermined temperature gradient may be maintained during the transition of liquid to solid sulphur, the solid product will be free from amorphous sulphur and the product will have definite and reproducible properties in such further processing as grinding. When the viscous sulphur formed in the reaction chamber is allowed to cool down to 120° to 130° centigrade, it is quite mobile. One of the purposes of so maintaining the sulphur at this temperature, just above its melting point, is that it provides an excellent scrubbing agent for use in the second phase of the process. It provides a plug to control the passage of gases.

*Scrubbing action*

The gases which make their exit into the chamber 16 which have water vapor, flowers of sulphur, etc., entrained, are conducted through the pipe 17. This body of steam and sulphur vapor rises through the pipe 18 into the bottom of a scrubbing chamber 19. At this point it meets a body of liquid sulphur at a temperature of frgom 120 to 130° centigrade, flowing in the opposite direction having been removed from the chamber 11, through the pipe 20, pump 21, and pipe 22, into the top of the scrubbing chamber 19 at 23, whence it passes downwardly over suitable scrubbing plates or the equivalent, at 24, encountering the upcoming sulphur vapors and steam, with the result that the flowers of sulphur are picked up by molten sulphur from the gas and returned through the pipe 25 to the molten sulphur reservoir 11. The steam passes out at the top of the chamber 19 at 26. When sulphur vapor is thus carried by a stream of nitrogen, air or superheated steam through a scrubber containing liquid sulphur, all of the sulphur is removed from the gas phase. The exit gases bubble through the layers of molten sulphur at the temperatures indicated between 120 to 165° centigrade. The reason for limiting, at this stage of our knowledge, the temperature to 165° centigrade, is that above that point it becomes quite viscous. If desired, the sulphur can be maintained as an independent body at such temperatures, and can be pumped through the scrubber.

It will be understood that the heat derived from condensing the steam, making its exit at 26, may be employed to start the preheating of the gases for the reaction chamber.

It is further understood that the reaction in the reaction chamber 7, is above the boiling point of sulphur; the temperature gradient in the chamber 16 runs from about the boiling point of sulphur to just above the melting point; and the temperature in the chambers 11 and 19 is maintained just above the melting point of sulphur.

It will be understood that while we have described herein certain specific embodiments of our invention, it is not our intention to be limited to or circumscribed by the specific details of construction, arrangement of parts, proportions, or procedures described and illustrated in view of the fact that our invention is susceptible to modifications depending on individual conditions and preference without departing from the spirit of this disclosure and the scope of the appended claims.

We claim:

1. An apparatus for the recovery of sulphur from gases comprising a tower, an inlet for reacting gases at the top thereof, the upper portion of said tower being filled with packing and forming a reaction space, means for supporting said packing, a receiving space below said supporting means for the accumulation of liquid sulphur, a reflux condenser adjacent said tower, a connection from the bottom of said condenser to the tower immediately below said support, a connection from the bottom of said condenser to the receiving space below said first connection, a connection from the bottom of said receiving space to the top of said condenser, pumping means in said last named connection, an outlet to the exterior from the bottom of said receiving space, a vapor outlet from the top of the condenser and means to maintain said tower at a temperature insuring the reaction in the top portion of the tower and above the liquefaction point of sulphur in the receiving space thereof.

2. An apparatus for the recovery of sulphur from gases comprising a tower, an inlet for reacting gases adjacent the top thereof, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top of said condenser, and means to maintain said reaction space in said tower at a temperature insuring the reaction of the gases in said space.

3. An apparatus for the recovery of sulphur from gases comprising a tower, an inlet for reacting gases adjacent the top thereof, a space below said inlet forming a gas receiving chamber, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, and means to maintain said reaction space in said tower at a temperature insuring the reaction of the gases in said space.

4. An apparatus for the recovery of sulphur from gases comprising a tower, a plurality of inlets for reacting gases adjacent the top thereof, a space below said inlets forming a gas receiving chamber, a partition in said chamber forming separate gas receiving compartments, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, and means to maintain said reaction space in said tower at a temperature insuring the reaction of the gases in said space.

5. An apparatus for the recovery of sulphur from gases comprising a tower, a plurality of inlets for reacting gases adjacent the top thereof, a space below said inlets forming a gas receiving chamber, a partition in said chamber forming separate gas receiving compartments, a heat transfer jacket surrounding said gas receiving chambers, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, and means to maintain said reaction space in said tower at a temperature insuring the reaction of the gases in said space.

6. An apparatus for the recovery of sulphur from gases comprising a tower, an inlet for reacting gases adjacent the top thereof, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, and a heat transfer jacket surrounding said reaction space to maintain said space at a temperature insuring the reaction of the gases therein.

7. An apparatus for the recovery of sulphur from gases comprising a tower, an inlet for reacting gases adjacent the top thereof, a space below said inlet forming a gas receiving chamber, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, and a heat transfer jacket surrounding said reaction space to maintain said space at a temperature insuring the reaction of the gases therein.

8. An apparatus for the recovery of sulphur from gases comprising a tower, an inlet for reacting gases adjacent the top thereof, a space below said inlet forming a gas receiving chamber, a heat transfer jacket surrounding said gas receiving chamber, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, and a heat transfer jacket surrounding said reaction space to maintain said space at a temperature insuring the reaction of the gases therein.

9. An apparatus for the recovery of sulphur from gases comprising a tower, an inlet for reacting gases adjacent the top thereof, a space below said inlet forming a gas receiving chamber, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, a heat transfer jacket surrounding said reaction space to maintain said space at a temperature insuring the reaction of gases therein, and a connection from said gas receiving chamber jacket to said receiving space for transferring heat of the reaction gases from said receiving space to said gas receiving chamber jacket.

10. An apparatus for the recovery of sulphur from gases comprising a tower, an inlet for reacting gases adjacent the top thereof, a space below said inlet forming a gas receiving chamber, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, a heat transfer jacket surrounding said reaction space to maintain said space at a temperature insuring the reaction of gases therein, a connection from said gas receiving chamber jacket to said receiving space for transferring heat of the reaction gases from said receiving space to said gas receiving chamber jacket, and a heat transfer jacket surrounding said receiving space.

11. An apparatus for the recovery of sulphur from gases comprising a tower, a plurality of inlets for reacting gases adjacent the top thereof, a space below said inlets forming a gas receiving chamber, a partition in said gas receiving chamber forming separate gas receiving compartments, a portion of said tower being filled with packing and forming a reaction space, means for supporting said packing, a receiving space below said supporting means for accumulation of said liquid sulphur, a reflux condenser adjacent said tower, a connection from the bottom portion of said condenser to the tower below said support, a connection from the bottom portion of said condenser to the receiving space below said first connection, a connection from the bottom portion of said receiving space to the top portion of said condenser, pumping means for pumping fluid through said last-named connection, an outlet to the exterior from the bottom portion of said receiving space, a vapor outlet from the top portion of said condenser, a heat transfer jacket surrounding said reaction space to maintain said space at a temperature insuring the reaction of gases therein, a connection from said gas receiving chamber jacket to said receiving space for transferring heat of the reaction gases from said receiving space to said gas receiving chamber jacket, and a heat transfer jacket surrounding said receiving space.

WILLIS C. FERNELIUS.
JAMES P. McREYNOLDS.